UNITED STATES PATENT OFFICE.

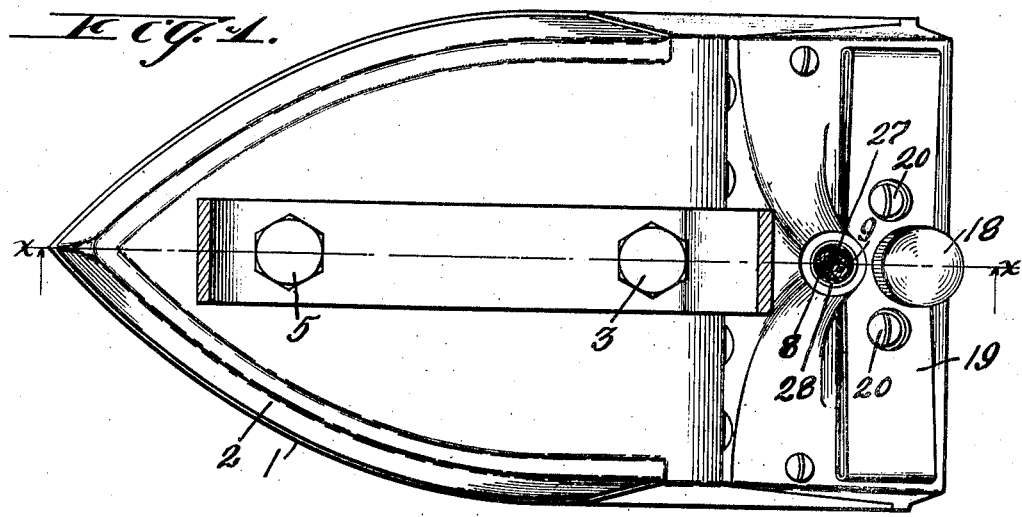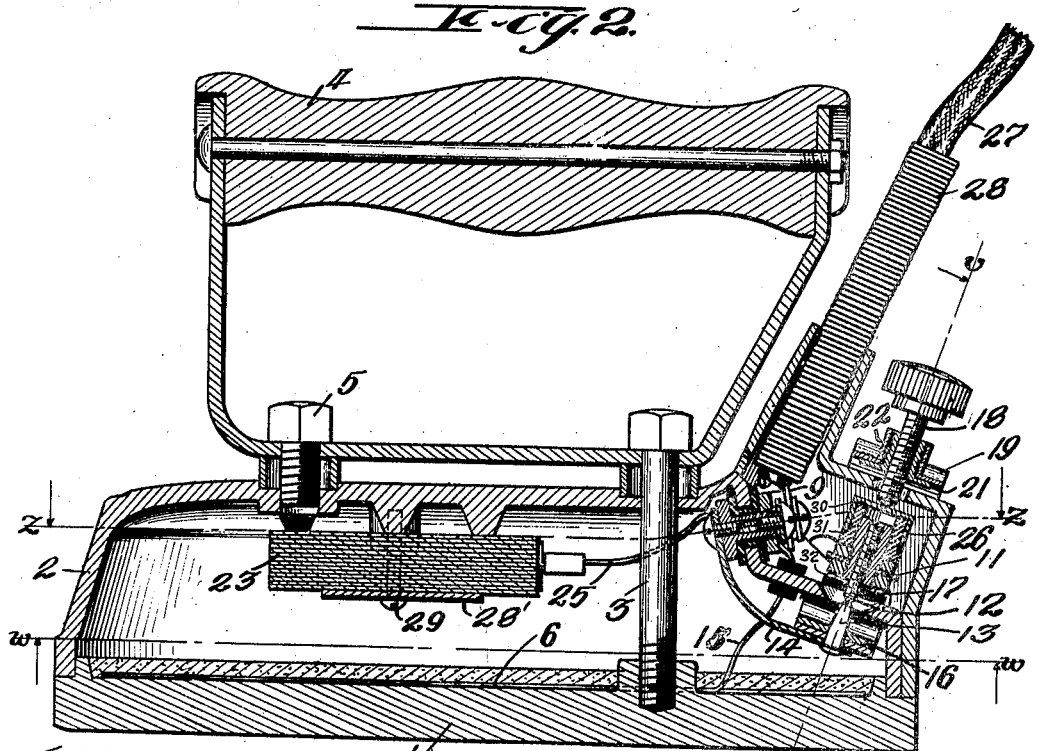

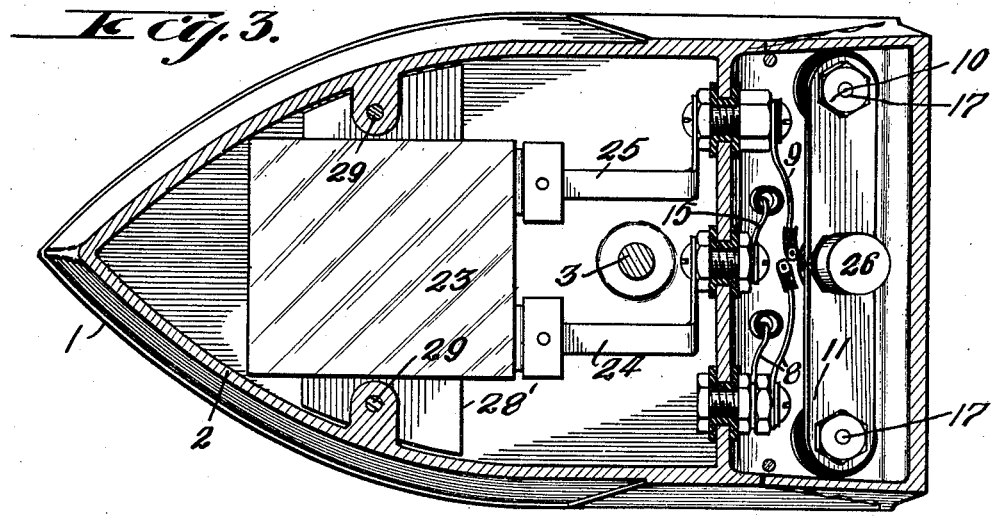
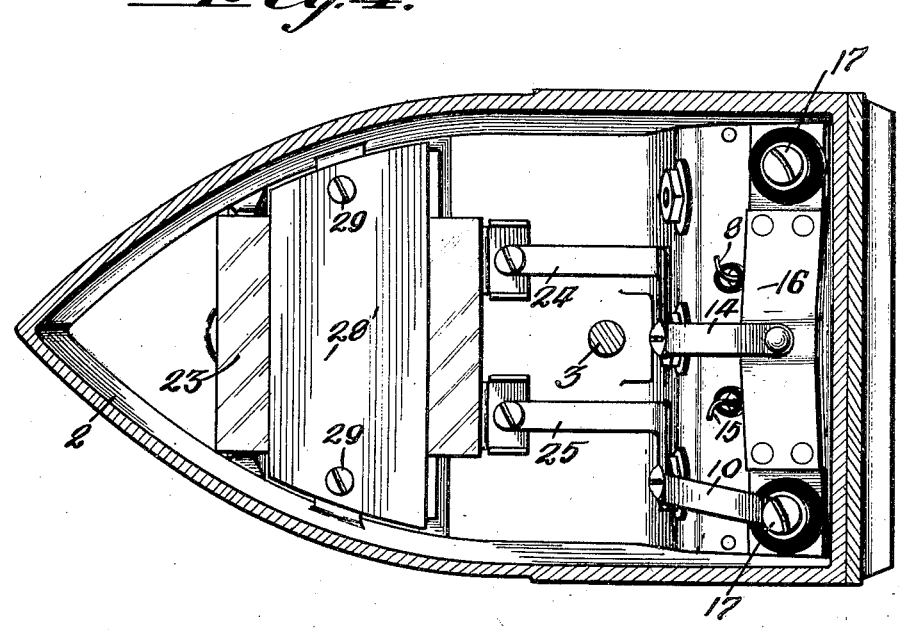

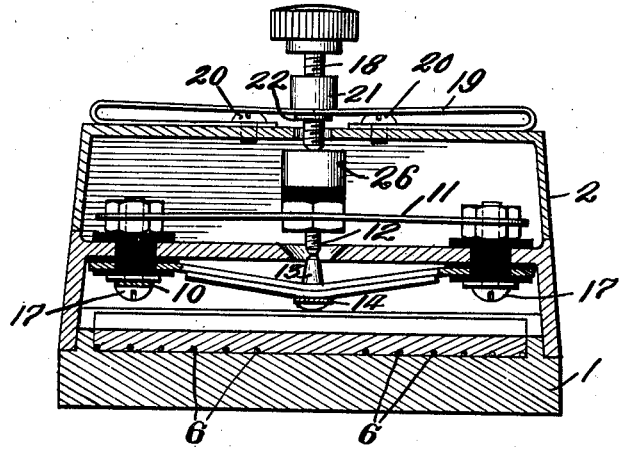
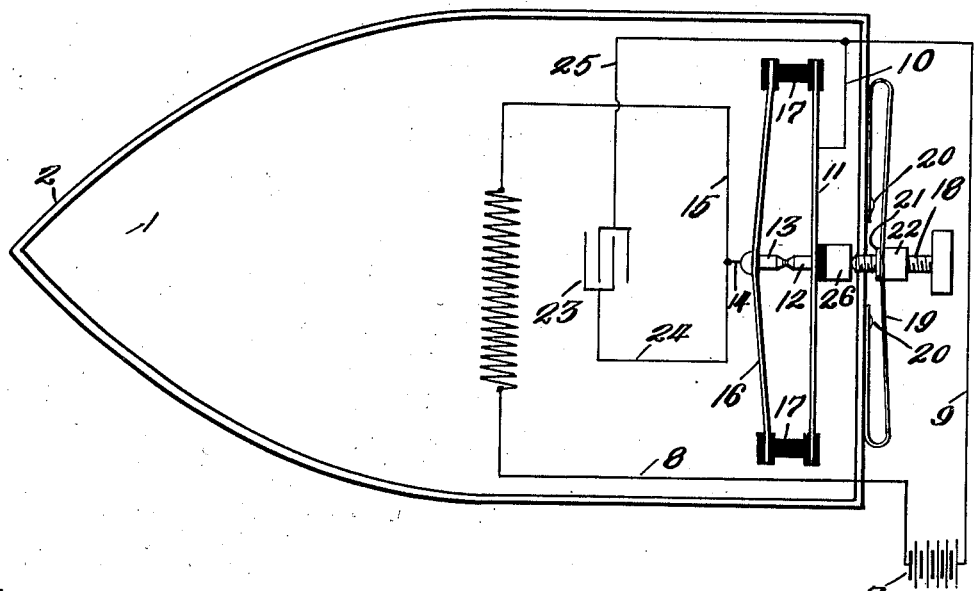

WILLIAM A. BRAUN, OF CANAL DOVER, OHIO, ASSIGNOR TO DOVER MANUFACTURING COMPANY, OF CANAL DOVER, OHIO.

ELECTRIC SAD-IRON.

1,138,841.  Specification of Letters Patent.  Patented May 11, 1915.

Application filed October 12, 1912. Serial No. 725,362.

*To all whom it may concern:*

Be it known that I, WILLIAM A. BRAUN, a citizen of the United States, residing at Canal Dover, county of Tuscarawas, and State of Ohio, have invented new and useful Improvements in Electric Sad-Irons, of which the following is a specification.

My invention relates to improvements in that class of thermo regulating devices for which Letters Patent Number 974232 were issued to me November 1, 1910. While the heat regulating device disclosed in said patent is shown and described as being in connection with a sad iron, my present improvement is adapted to be used not only in connection with sad irons, but also in connection with soldering irons, fireless cookers, heaters, and for a great variety of other purposes.

My invention pertains, first, to the means for adjusting the device for changing the range of temperature, whereby the predetermined temperature required for a certain duty, will be produced; and second to the heat controlling device for automatically cutting out the electric current the instant the desired temperature is reached, and also for automatically turning the current on at the desired moment as the temperature is lowered, whereby a higher or lower uniform temperature may be maintained as circumstances or work to be done may require.

It is a well known fact that a much stronger electric current may be properly used when first heating a cold object than is required to maintain the required temperature after such object has become heated, and it therefore becomes necessary after such object is heated, to reduce the electric current, otherwise such object may become excessively heated.

The object of my invention is, therefore, to provide a simple and efficient means not only for adjusting the device for producing the desired range of temperature, but also to provide means for automatically cutting out or turning on the electric current, whereby a steady uniform temperature of the desired range may be automatically maintained.

My invention is further explained by reference to the accompanying drawings, in which—

Figure 1 represents a plan view thereof, with the operating handle removed. Fig. 2 represents a vertical section of the device shown in Fig. 1, with the operating handle attached, taken on line *x—x* of Fig. 1. Fig. 3 is a section taken on line *z—z* of Fig. 2. Fig. 4 is a section taken on line *w—w* of Fig. 2, looking upwardly. Fig. 5 is a section drawn on line *v—v* of Fig. 2, and Fig. 6 is a diagrammatic view, showing the condenser, heating resistance, and current regulating mechanism.

Like parts are identified by the same reference numerals throughout the several views.

While my thermo regulating device is equally adapted, as stated, to be used in connection with a great variety of other things, for brevity of description, the same will be described as connected with a sad iron.

1 represents the smoothing core of a sad iron which is adapted to be heated by an electric current.

2 represents an inclosing shell which is secured to the core 1 by the bolt 3.

4 is an operating handle of ordinary construction which is connected with the shell through the bolts 3 and 5, as more clearly shown in Fig. 2.

6 is a heating resistance of ordinary construction by which the core 1 is heated.

7 represents the source of electric energy. One pole of the electric circuit is connected with the heating resistance 6 through the conductor 8, while the opposite pole is connected with the opposite pole of the heating resistance by the electric conductor 9, resilient plate 11, terminals 12 and 13, and electric conductors 14 and 15, whereby the electric circuit is completed between the electric supply and the heating resistance.

It will be understood that the terminals 12 and 13 are normally in contact, whereby, as soon as the current is turned on which connects the generator with the heating resistance, the temperature will be raised in such heating resistance, whereby the core becomes heated. The electric terminal 13 is supported from the resilient bar 16, and the resilient bar 16 is supported from the shell of the sad iron by the insulating posts 17, 17, and the bar 16 is adapted, as it is heated, to expand and thereby move the terminal 13 out of contact with the terminal 12, whereby the electric circuit which communicates with the heating resistance 6, is broken.

It will be understood that a higher or lower temperature will be required to break the circuit between the terminals 12 and 13, according to the degree of pressure applied to the terminal 12. It therefore follows that when a low temperature only is required in the sad iron, the terminal 12 is held in yielding contact with the terminal 13 with a slight pressure only, whereby a slight rise of temperature will be sufficient to move said terminal 13 out of contact with the terminal 12, when the core 1 will be but slightly heated. When the terminals have been thus separated and the temperature of the core slightly lowered, the movement of said bar and terminal will be reversed, when the terminals will be again brought into contact. It will now be understood that when a higher temperature is desired, the terminal 12 is moved forward with increased pressure against the terminal 13 by turning forward the adjusting screw 18, when a high temperature will be required before said plate 16 will be expanded far enough to separate said terminals, whereby the iron or other object with which the heating resistance 6 is connected will be raised to a high temperature before the electric current will be cut out. The adjusting screw 18 is preferably yieldingly supported from the shell 2 on the resilient plate 19, and said plate 19 is connected with the shell by the rivets 20, or in any other convenient manner. The plate 19 is provided with a central aperture for the reception of the set screw 18, and said plate is retained in place on said screw by and between the clamping nuts 21 and 22.

23 is an electric condenser of ordinary construction, and the same is connected upon one side with the branch 14 of said electric circuit through the branch 24, and upon the other side with the main circuit 9 of said electric circuit through the branch 25.

By my device as heretofore constructed and as shown in my said patent, the temperature of the sad iron is regulated by increasing or diminishing the resistance applied to the resilient bar 16 upon which the movable terminal 13 is supported, while by my present construction, no resistance is applied to said resilient bar, but instead, the action of such resilient bar is regulated by the pressure of the opposing terminal 12 against the terminal 13, carried by said bar. When said opposing terminal 12 is adjusted forwardly by pressure applied through the hand screw 18, a higher temperature is required, as stated, to separate said terminals, and when such screw 18 is turned in the opposite direction, a lower temperature will be required to separate such terminals. In view of the fact that a delicate adjustment of the screw 18 is required to produce the desired results, said screw is supported, as stated, from said shell 2 through the resilient member 19, and the inner end of such screw acts with yielding pressure against the resilient plate 11, through the member 26.

For convenience of operation, the respective branches 8 and 9 of the electric circuit are insulated from each other in the ordinary manner, and inclosed in a single fabric 27, and are then preferably surrounded near their ends with a coil of wire 28, which serves as a shield for protecting the insulating fabric. The condenser 23 is suspended from the top of the cover by a supporting plate 28', and screws 29.

It will be understood that the resilient bar 11 is located outside of the shell, and its movement is not affected by heat, while the resilient bar 16 is located within the shell in close proximity to the heating resistance, and it is adapted to be expanded and curved away from the other bar as the core becomes heated, and for brevity of description, the bar 11 is referred to in the claims as an exterior bar and the bar 16 as an interior or heat actuated bar.

By referring to Fig. 2, it will be seen that the member 26 comprises several parts, namely, a metallic cap 30, insulating collar 31, and screw threaded sleeve 32. The terminal 12 is also provided on its sides with a screw thread, and at its upper end with a notched head, and is adapted as it is turned to be adjusted longitudinally within said threaded sleeve 32 toward and from the terminal 13, whereby the required adjustment of said terminals may be provided for producing a predetermined normal temperature of the device before the same is placed upon the market. When, however, circumstances or the work to be performed requires a higher or lower temperature, said terminals 12 and 13 may be forced together with greater or less tension by the adjustment of the screw 18, as previously described.

Having thus described my invention, what I claim as new and desire to secure by Letters Patent, is—

1. In a device of the described class, the combination with a member to be heated, of a heating resistance carried by said member, a source of electric energy, an electric circuit, the respective branches of which are normally connected at one of their ends with said source of electrical energy and at their other end with said heating resistance, a pair of electric terminals, a thermostat comprising two bars, one within and one without the member to be heated, supporting said terminals, located in and adapted to form a part of one of the branches of said electric circuit, both of said bars being supported at their respective ends from the same insulating posts, and means for manually increasing or diminishing the pressure of the terminal carried by said exterior bar against the opposing terminal.

2. In a device of the described class, the combination with a member to be heated, of a heating resistance carried by said member, a source of electric energy, an electric circuit, the respective branches of which are normally connected at one of their ends with said source of electrical energy and at their other ends with said heating resistance, a pair of electric terminals, a thermostat comprising two bars, one within and one without the member to be heated, supporting said terminals, located in and adapted to form a part of one of the branches of said electric circuit, a pair of insulating posts, said exterior and interior bars each supported at their respective ends from one of said insulating posts, means for manually increasing or diminishing the pressure of the terminal carried by said exterior bar against the opposing terminal, whereby the action of said interior bar is controlled and regulated without applying direct resistance to its movement, an electric condenser and electric conductors communicating between the respective sides of said condenser and the respective branches of said electric circuit.

3. In a device of the described class, the combination with a member to be heated, of a heating resistance carried by said member, a source of electric energy, an electric circuit, the respective branches of which are normally connected at one of their ends with said source of electrical energy and at their other ends with said heating resistance, a pair of electric terminals, an exterior and an interior bar supporting said terminals, located in and adapted to form a part of one of the branches of said electric circuit, a resilient plate supported from the exterior of the body to be heated, a hand actuated screw adjustably supported from said resilient plate in close proximity to said exterior bar, an insulating bearing interposed between said bar and the opposing end of said screw, said screw being adapted, as it is turned forward and rearward against said insulating member, to increase and diminish the pressure of the terminal carried by said exterior bar against the terminal carried by said interior bar, whereby the action of said interior bar is controlled and regulated without applying direct resistance to its movement.

4. In a device of the described class, the combination with a member to be heated, of a heating resistance carried by said member, a source of electric energy, an electric circuit, the respective branches of which are normally connected at one of their ends with said source of electrical energy and at their other ends with said heating resistance, a pair of electric terminals, an exterior and an interior bar supporting said terminals, located in and adapted to form a part of one of the branches of said electric circuit, said bars being supported at their respective ends from insulating posts, a hand actuated screw yieldingly supported in adjustable bearings, an insulating bearing interposed between said bar and the opposing end of said screw, said screw being adapted, as it is turned forward and rearward against said insulating member, to increase and diminish the pressure of the terminal carried by said exterior bar against the terminal carried by said interior bar, whereby the action of said interior bar is controlled and regulated without applying direct resistance to its movement.

5. In a device of the described class, the combination with a member to be heated, of a heating resistance carried by said member, a source of electric energy, an electric circuit, the respective branches of which are normally connected at one of their ends with said source of electrical energy and at their other ends with said heating resistance, a pair of electric terminals, an exterior and an interior bar supporting said terminals, located in and adapted to form a part of one of the branches of said electric circuit, a pair of insulating posts, said interior and exterior bars being both supported at their respective ends from said insulating posts, a hand actuated screw yieldingly supported in adjustable bearings, an insulating bearing interposed between said bar and the opposing end of said screw, said screw being adapted, as it is turned forward and rearward against said insulating member, to increase and diminish the pressure of the terminal carried by said exterior bar against the terminal carried by said interior bar, whereby the action of said interior bar is controlled and regulated without applying direct resistance to its movement, an electric condenser, and electric conductors communicating between the respective sides of said condenser and the respective branches of said electric circuit.

In testimony whereof I affix my signature in the presence of two witnesses.

WILLIAM A. BRAUN.

Witnesses:
W. H. KREITER,
OLIVER TOOMEY.